US005694120A

United States Patent [19]
Indekeu et al.

[11] Patent Number: 5,694,120
[45] Date of Patent: Dec. 2, 1997

[54] METHOD FOR SELECTING INFORMATION SERVICES FROM A MENU IN SELECTIVE CALL TRANSCEIVERS

[75] Inventors: Jack P. Indekeu, Lake Worth, Fla.; Christopher G. Henz, Roanoke, Tex.

[73] Assignee: Motorola, Inc., Schaumbrug, Ill.

[21] Appl. No.: 606,949

[22] Filed: Feb. 26, 1996

[51] Int. Cl.⁶ .................................................. H04Q 1/00
[52] U.S. Cl. ................................ 340/825.44; 455/38.1; 379/57
[58] Field of Search ................ 340/825.44; 455/38.1; 379/57, 59

[56] References Cited

U.S. PATENT DOCUMENTS

| | | | |
|---|---|---|---|
| 4,845,491 | 7/1989 | Fascenda | 340/825.44 |
| 4,894,649 | 1/1990 | Davis | 340/825.44 |
| 5,131,020 | 7/1992 | Liebesny et al. | 379/59 |
| 5,426,422 | 6/1995 | Vanden Heuvel et al. | 340/825.44 |
| 5,426,424 | 6/1995 | Vanden Heuvel | 340/825.44 |

*Primary Examiner*—Brian Zimmerman
*Attorney, Agent, or Firm*—Keith A. Chanroo

[57] ABSTRACT

A selective call transceiver (200) has a plurality of assignable address ports (246), a receiver (204) for receiving a directory of information services (120-132) on a mail drop address port, a controller (210) for generating a menu (240) from the directory of information services (120-132), a display (228) for displaying the menu (240) of the information services from the plurality of assignable address ports (246) and a user interface (216) for selecting an information service (242) from the menu (240) of information services. The controller (210) is further coupled to the user interface (216) to assign the information service being selected to the identified assignable address port, and a transmitter (208) transmits a request for the selected information service (242) including an address for identifying selectable address port.

20 Claims, 4 Drawing Sheets

METHOD FOR SELECTING INFORMATION SERVICES FROM A MENU IN SELECTIVE CALL TRANSCEIVERS

FIELD OF THE INVENTION

This invention relates in general to selective call transceivers and more specifically to a method for selecting information services from a menu in a selective call transceiver.

BACKGROUND OF THE INVENTION

A conventional selective call receiver, e.g., a pager, often can receive messages from more than one sources. Sources are distinguished from each other typically by address information associated with each message or information service. When the address information correlates, or matches, a predetermined address information in the selective call receiver, the selective call receiver receives and stores the message from a particular information source. In an audible mode, each predetermined address information, i.e., each source, can be configured to invoke an audible alert having a cadence, or pattern, that is distinguishable from other predetermined address information, i.e., other sources. For example, a user can distinguish messages received from different sources by the cadence of the audible alert. Optionally, a visual indicator on a display can provide the visual alert for identifying the particular source. This method of receiving and presenting messages, and identifying sources, to the user is well known in the art.

The predetermined address information in the selective call receiver are normally preconfigured by the service center or the manufacturer. Hence, the predetermined address information are normally fixed and unchangeable by the user. Normally, the user can only select the type of alert desired, e.g., audible alert or silent alert, for the entire selective call receiver. Typically, the user enters the selection via user controls in the selective call receiver.

Modern selective call services are capable of sending multiple types of information, for example, stock market, weather, sports, news or other information periodically to a subscribing selective call receiver. Before long, hundreds of information services are likely to be transmitted to selective call receivers. With this rapid expansion, the number of services will easily exceed the amount of information a user of a selective call receiver can easily receive based upon the limitation of the number of messages which is subject to the number of address ports and the storage capacity.

Thus, what is needed is selective call transceiver/receiver that is able identify the types and number of information services available and change or select information services from the available information services.

DESCRIPTION OF A PREFERRED EMBODIMENT

Figure 1:
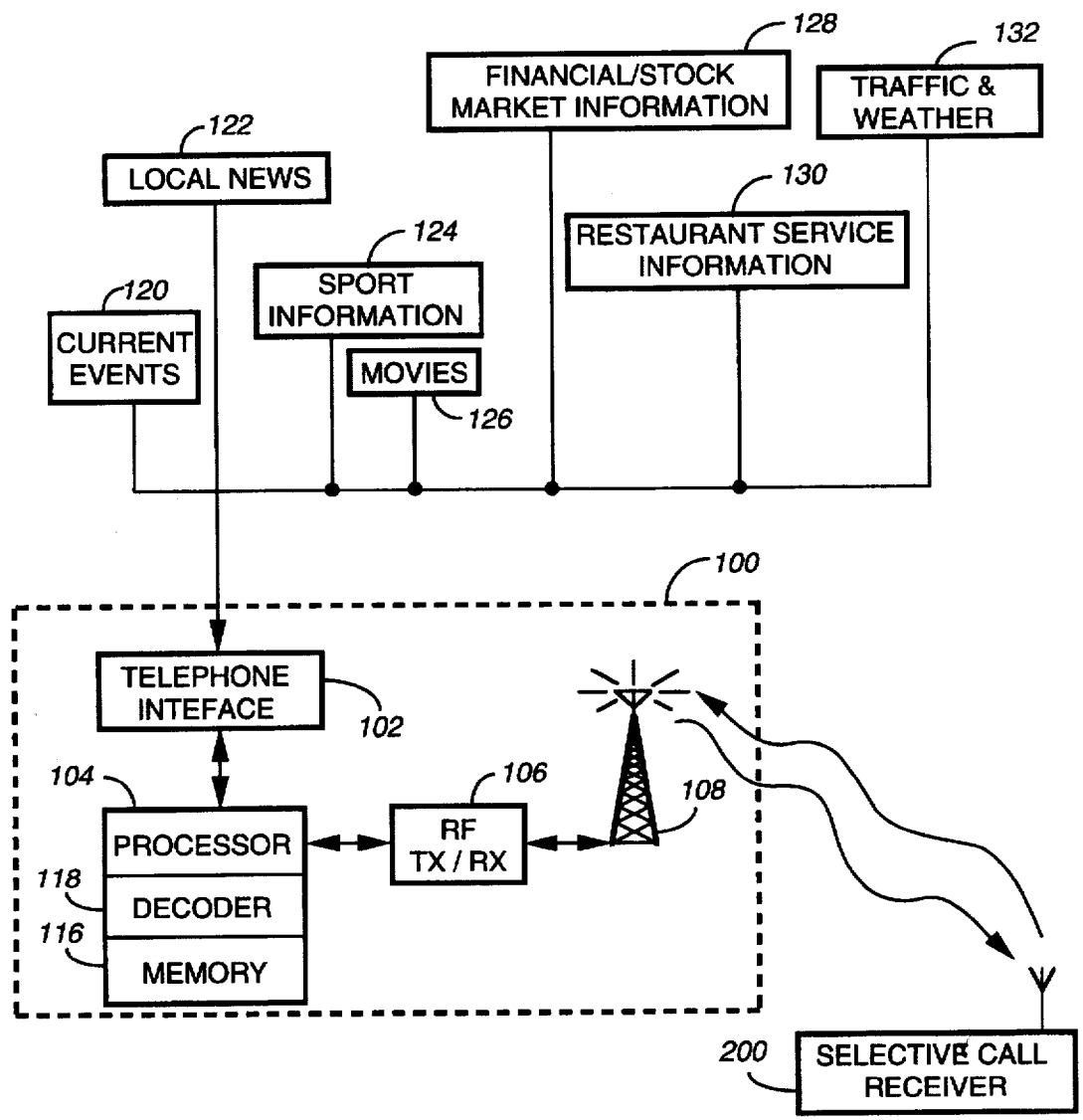
FIG. 1 is an electrical block diagram of a selective call system receiving a plurality of information services in accordance with a preferred embodiment of the present invention.

Referring to FIG. 1, a block diagram of a communication system is shown in accordance with the preferred embodiment of the present invention. Preferably, the communication system comprises a base station (or selective call terminal) 100 including a radio frequency (RF) transmitter/receiver 106 capable of transmitting and receiving information in a manner well known to one skilled in the art. The transmitter/receiver 106 is coupled to a base site processor 104, the base site processor 104 has a decoder 118 for decoding information service and other messages received by the transmitter/receiver 106 and a memory 116 which stores, among other things, information relating to a plurality of information service providers (or information services or information service files) 120–132. The processor 104 generates a directory identifying the information services that can be received by a selective call transceiver (or receiver) 200 coupled thereto. The directory includes, for example, the type and title of the information services. The directory can also note which information service (subscription information) that requires a subscription fee to be received. The plurality of information service providers 120–132 are preferably coupled to a telephone interface 102 which is coupled to the processor 104.

When the base site processor 104 receives information from the plurality of information services 120–132, it stores the information services in the memory 116 as the directory of information services 120–132. The plurality of information services 120–132, as shown, are coupled to the processor 104 via the telephone interface 102 for periodically receiving information to update the memory 116. The directory of information services is transmitted to at least one selective call receiver or transceiver 200 to a predetermined address port, for example a group or mail drop address. The selective call transceiver 200, as shown, receives the directory of information services and in response to a user selection, requests information relating to a selected information service being subscribed to or selected by selecting one of the information service from the directory to be described in detail below. The base station 100, upon receipt of the information service request from for example a transceiver 200, determines whether the user (selective call transceiver 200) requesting same is authorized to receive the information service. If access is denied, the user is informed of what things are to be done before access will be granted, for example the payment of an access or subscription fee. If the user has access to the information service selected from the plurality of information service files, the information service is transmitted by an antenna 108 to the user at the address port identified by the request.

Figure 2:
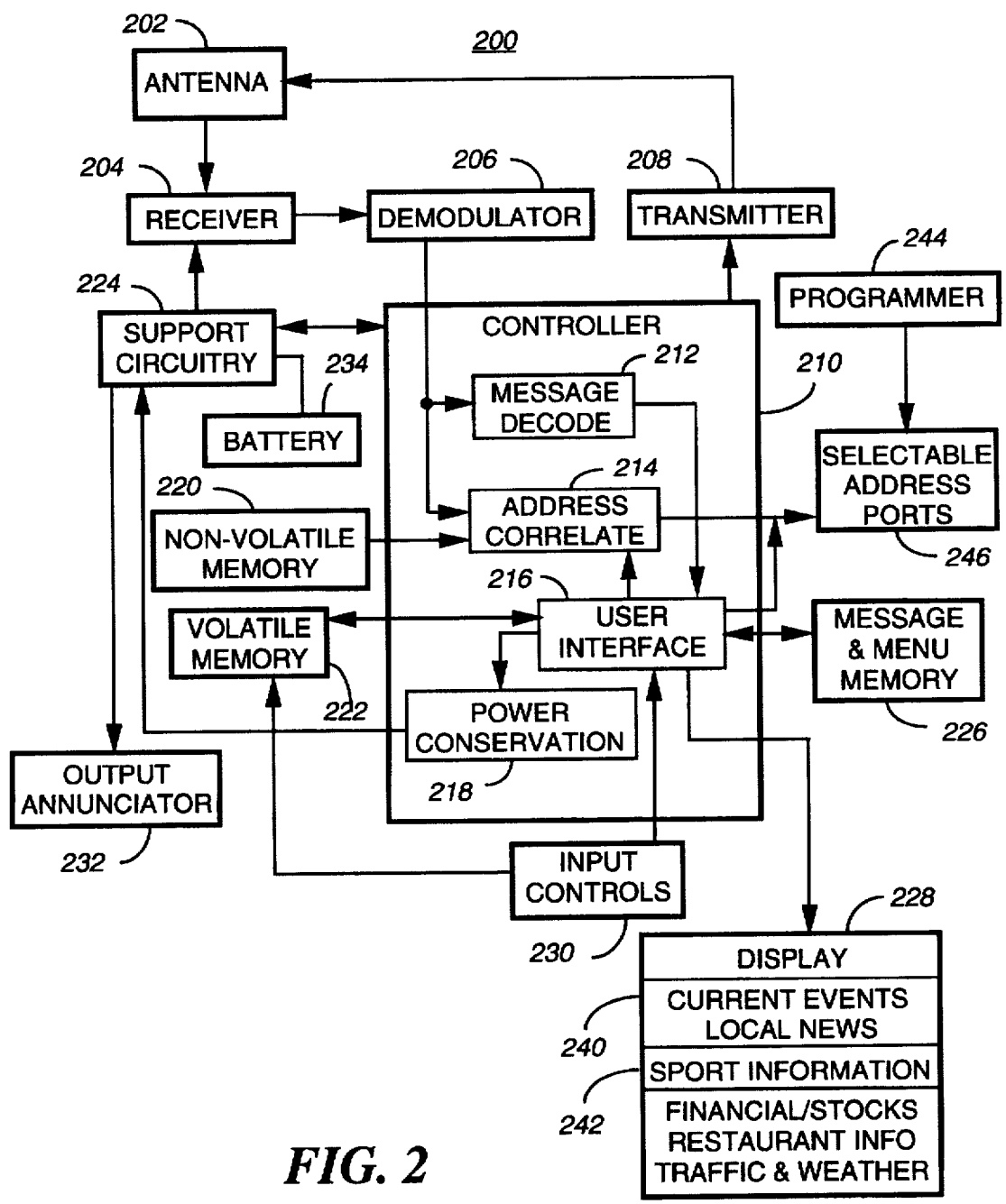
FIG. 2 shows a block diagram of a selective call transceiver according to the preferred embodiment of the present invention.

FIG. 2 shows a block diagram of a selective call transceiver according to the preferred embodiment of the present invention. The selective call transceiver (or receiver) 200 is powered by a battery 234 and operates to receive and to transmit a radio frequency signal via an antenna 202. A receiver 204 is coupled to the antenna 202 to receive the radio frequency signal. A demodulator 206 is coupled to the receiver 204 to recover any information signal present in the radio frequency signal using conventional techniques. The recovered information signal from the demodulator 206 is coupled to a controller 210 which decodes the recovered information in a manner well known to those skilled in the art.

In the preferred embodiment, the controller 210 comprises a microcomputer, such as a Motorola, Inc. manufactured microcomputer, e.g., MC68HC05C4, and has a signal processor performing the function of a decoder, which is normally implemented in both hardware and software. The signal processor comprises an address correlator 214 and a message decoder 212, using methods and techniques known to those skilled in the art. The address correlator 214 checks the recovered information signal from the output of the demodulator 206 for address information and correlates a recovered address information with one of a plurality of predetermined address information that are stored in the selective call transceiver's non-volatile memory 220. When the recovered address information correlates with the predetermined address information designating a mail drop or group address, the information being received comprises the directory of information services. The message decoder 212 then decodes the message and generates an interactive menu 240 of information services. The menu 240 is then stored in a message and menu memory 226 and can be displayed on a display 228 by using input controls 230 to active the user interface 216 from any one to a plurality of assignable or selectable address ports 246.

When the menu 240 is activated or selected, the menu 240 is displayed for that assignable or selectable address port. If that assignable address port was previously selected or assigned to receive information service, the displayed menu 240 will, for example, display the selected information service for that assignable or selectable address port as highlighted text 242. If a new information service is selected, the controller determines if the selected information service is already been selected by the other assignable or selectable address port 246. If so, the user is informed that the selected information service is been received already on another selectable or assignable address port, for example selectable address port 6.

A programmer 244 programs or reprograms the selected address port 246 to receive the selected information service when an information service is selected for the first time. The menu 240 shows the new selected information service as the highlighted information service 242 at the selectable address port. Status information are stored in a memory 222, for example a volatile memory or electrically erasable memory indicating that the selectable address port is programmed or assigned to receive the selected information service shown highlighted 242 in the interactive menu 240. The controller 210 thereafter encodes the selectable address in a request to receive the selected information service on selected address port. The request is transmitted to the base site 100 via a transmitter 208. The base site can transmit a response, password or access code to enable the selective call transceiver via the programmer 244 to reprogram the controller 210 with the response or the password or access code to enable the receipt the selected information service by over-the-air programming. Techniques for over-the-air (OTA) programming are well known to one skilled in the art.

The controller recovers the address information for the selected information service sent to the selective call transceiver 200 and when it correlates with the assigned address port, the message decoder 212 decodes the information service and stores the decoded information service in the message and menu memory 226. In this way, a user of the selective call transceiver (receiver) 200 determines which information service to be received and selects the address port on which the information is to be received. Advantageously, the user of the selective call receiver or transceiver 200 can control which information to receive and when to receive the information by selecting the desired information service from an interactive menu for enabling the selection of information services 120-132. The user can receive any of the information services from the menu by selecting or reselecting an information service designated for the address port from which the selection is made. Accordingly, the user can receive more than one information service, and the number of information services capable of being received is limited to the number of selectable address ports 246.

After receiving, decoding, and storing the selected information service in a message memory 226, the selective call transceiver 200 typically presents at least a portion of the stored message to a user, such as by a display 228, e.g., a liquid crystal display. Additionally, along with receiving, decoding, and storing the information, an alert is presented to the user via an output annunciator 232. The alert can include an audible alert, a visual alert, a vibratory or silent alert, or a combination of the aforementioned alerts, using known methods and techniques.

A support circuit 224 preferably comprises a conventional signal multiplexing integrated circuit, a voltage regulator and control mechanism, a current regulator and control mechanism, audio power amplifier circuitry, control interface circuitry, and display illumination circuitry. These elements are arranged to provide support for the functions of the selective call receiver or transceiver 200 as requested by a user.

Additionally, the controller 210 determines from the enabled or disabled status information in the memory 222 whether to conserve power upon detection of an address information. That is, when a received and recovered address information correlates with a predetermined address in the non-volatile memory 220, the controller 210 checks the status information corresponding to the correlated predetermined address information to determine whether that address is enabled. If the controller 210 determines that the correlated predetermined address is not enabled then the message decoder 212 is not invoked. Further, the controller 210 signals a power conservation module 218 to begin conserving power for the selective call transceiver 200. The power conservation module 218 signals circuitry in the support circuit 224 to enter a low power mode (battery save mode). A number of power consuming circuits may be directed to a low power or standby mode of operation. Additionally, the signal from the power conservation module 218 signals, or strobes, the receiver circuitry 204 to a low power mode to conserve power. In this way, when a correlated address is not enabled, as indicated by the associated status information, the selective call transceiver 200 conserves power immediately, while not decoding an associated message and also not storing the message in message and menu memory 226. Of course, the power conservation module 218 will re-enable the receiver and other circuits at some later time. Methods of power conservation strobing in selective call transceivers are known to those skilled in the art. Further, the controller 210 inhibits any alerts to the user via the output annunciator 232. By not alerting again, power conservation is maximized. The status information, corresponding to each predetermined address information stored in the volatile memory 222, allow the controller 210 to disable functions in the selective call transceiver 200, and to conserve power when a correlated address is disabled, e.g., when no information service is selected for the address port.

Figure 3:
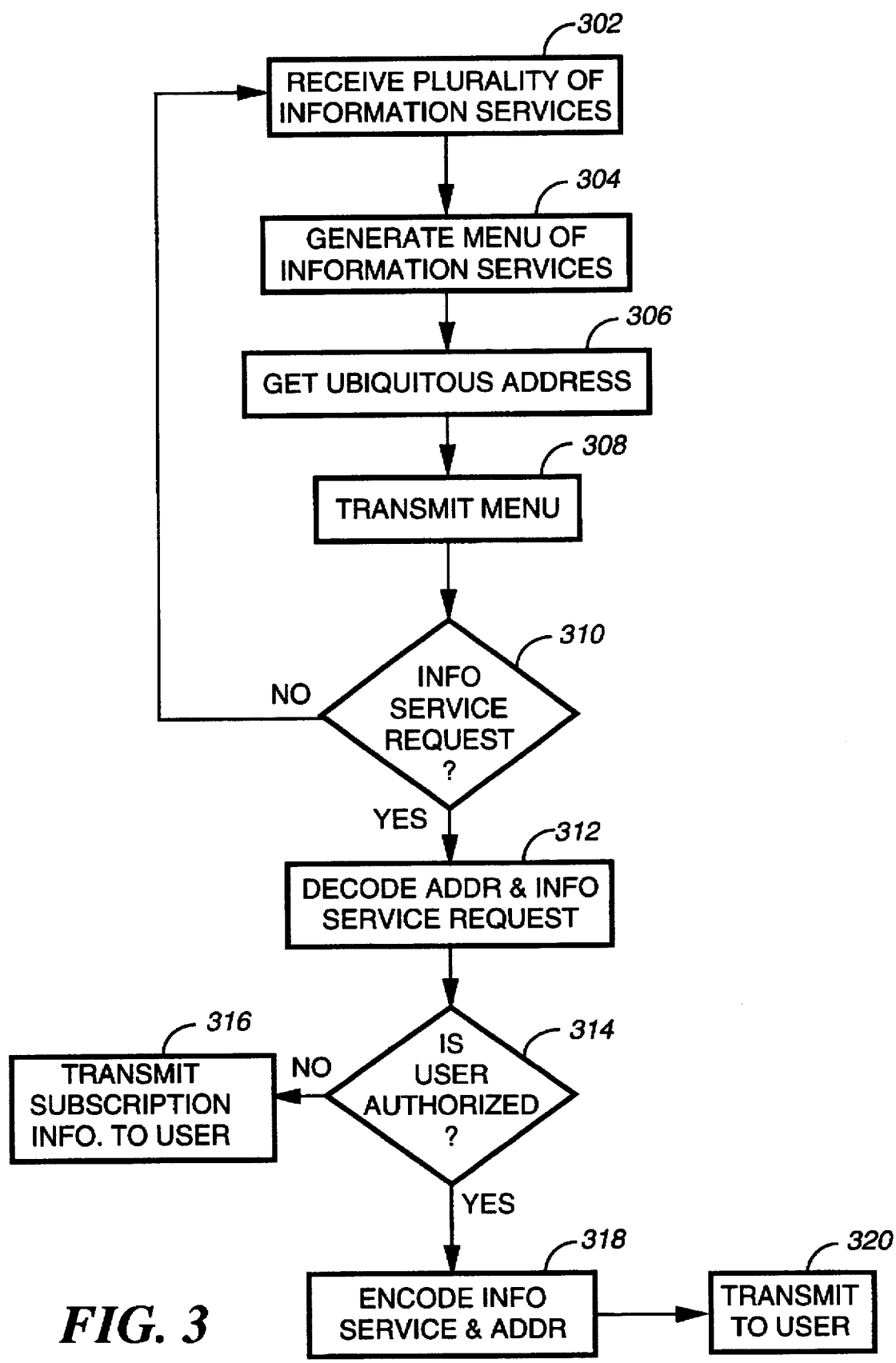
FIG. 3 a flow diagram of the selective call system of FIG. 1 illustrating the steps of transmitting a directory of information services in accordance with the preferred embodiment of the present invention.

FIG. 3 is a flow diagram illustrating the steps of transmitting a directory of information services in accordance with the selective call system of FIG. 1. As shown, the communication system receives a plurality of information services, step 302 and generates a directory of information listing the plurality or a subset of the plurality of information service being received and transmitted to the portable communication devices (subscriber units) 200 subscribing to the communication service, step 304. The base site 100 encodes a ubiquitous address, for example a mail drop address or a group address to enable the plurality of portable communication units (selective call transceiver) 200 to receive the directory of information service 120–132, step 306. The directory lists the information service transmitted to the plurality of communication devices 200, step 308.

The communication system checks if an information service request is received from a selective call transceiver 200, step 310, and if not, the process returns to receive information, step 302. If an information service request is received in step 310, the base site 100 decodes the address and any other information service included with the request, step 312. From the decoded address, the base site 100 determines whether the portable communication device is authorized to receive the information service it requested, step 314. If the communication device is not authorized, step 316, for example when the information request is a pay-to-receive service, the base site will transmit information to the portable communication device informing the user how to subscribe to the information service selected. Alternatively, the base site can simply transmit a response indicating that the user is not authorized. If the communication device is authorized, the information pertaining to the requested service is received from memory 116, encoded with the information and the address of the communication device, step 318. The encoded information is transmitted to the communication device or subscriber units requesting same, step 320.

Accordingly, the communication system or base sites receiving information services from a plurality of information sources can bundle these services and offer them to subscribers. To provide the subscribers with a choice, the communication systems transmit the title or type of services being offered to the plurality of portable communication devices on a group or mail drop address so all the portable communication devices can receive the directory of the information services. To further improve system time, the directory can be transmitted during time when the throughput on the channel is low, for example at nights.

Figure 4:
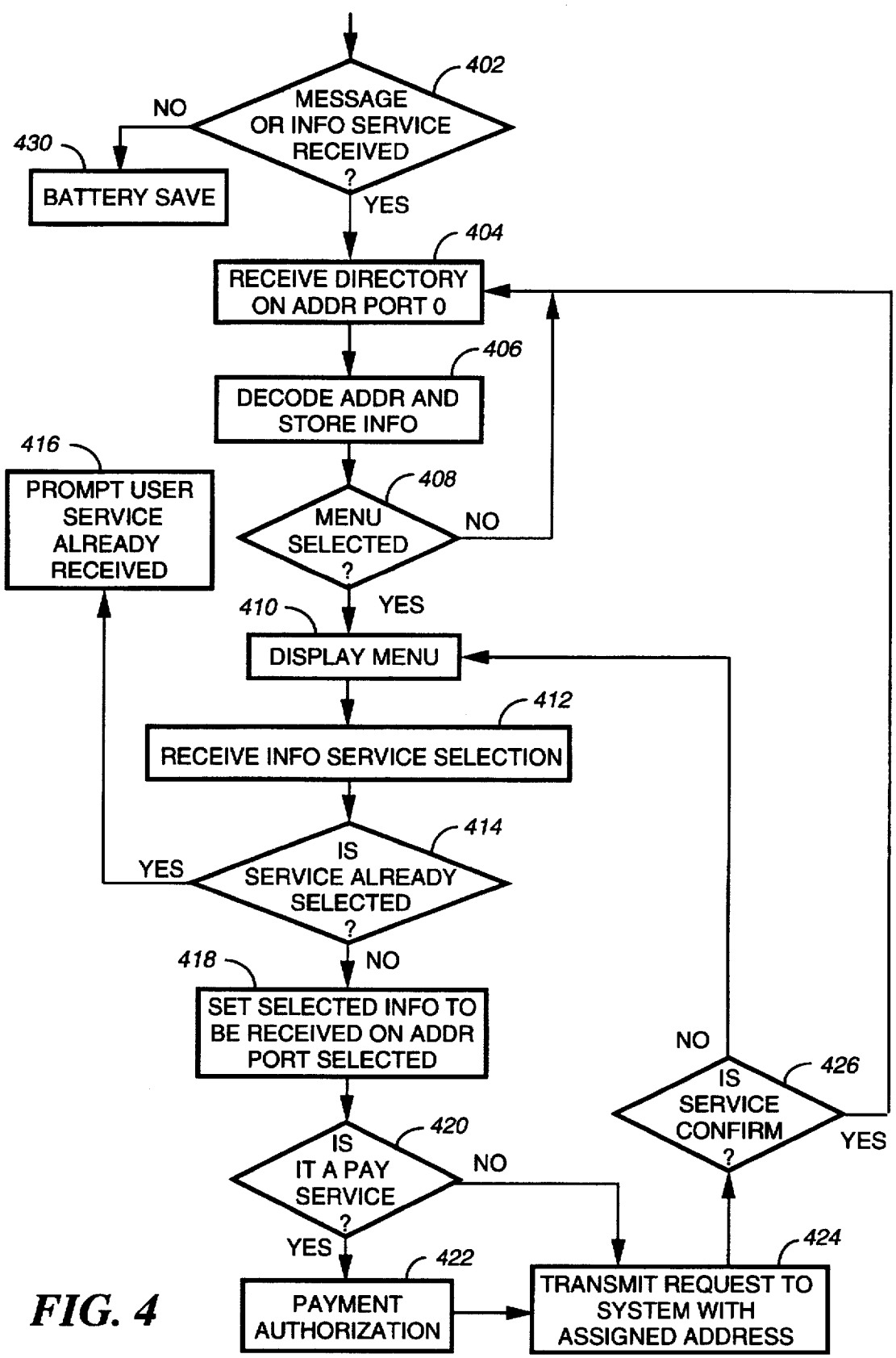
FIG. 4 a flow diagram of the selective call transceiver of FIG. 2 illustrating the steps of generating and displaying a menu for selecting information services in accordance with the preferred embodiment of the present invention.

FIG. 4 is a flow diagram illustrating the steps of generating and display a menu for selecting information services in accordance with the selective call transceiver of FIG. 2. Subsequent to the power-up sequence, the portable communication device checks if a message or an information service is received step 402, and if not the portable communication device initiates its battery save routine, step 430. When the portable communication device or subscriber unit detects its address, it receives the directory of information services on the mail drop or group address, for example, selectable address port 0, step 404. When a message or information service is received, the selective call transceiver, decodes the assigned selectable address port and store the information after verifying the status information stored in the volatile memory, step 406. In step 406, the controller 210 generates an interactive menu from the directory of information services. The menu is stored and in response to the user interface, the menu can be displayed from any of the plurality of selectable address ports.

The portable communication device or selective call transceiver 200 determines when the menu is selected, step 408. If not, the selective call transceiver continues its battery save cycle and waits for a message (or page). Responsive to a user input selecting the menu from a predefined address port, step 408, the selective call transceiver displays the menu of information services associated with the selectable address port from which the menu was "called-up" on, step 410. The selective call transceiver receives an information service selection via the displayed menu, step 412. The input interface and address correlator receive the selection and if the service is already selected, step 414, the user is informed that the information service selected has already been selected on another identified selectable address port. The request for the selected information service is terminated or suspended. When the information service has not been selected before, step 414, the step of programming or reprogramming the address of the selectable address port in the memory 222 as status information to direct the information when received to the programmed selectable address port, step 418. The menu can provide information for the selective call transceiver 200 to determine if the selected service is a pay-to-receive service, 420, and if so, the selective call transceiver checks to determine if it is authorized to receive the selected service, step 422. If the service in not a pay-to-receive service, step 420, or after authorization is checked, step 422, the selective call transceiver encodes and transmit a request to the communication system along with its address to subscribe or receive the selected information service, step 424. Subsequent to the transmission, the selective call transceiver waits for service confirmation from the communication system, step 426. When the communication system refuses to authorize the selective call transceiver, the selective call transceiver redisplays or continues to display the menu to enable another service to be selected, step 410. If service is confirmed, step 426, the selective call transceiver proceed to wait for a message or the selected service information, step 404.

In this way, a communication system that receives information services from a plurality of sources generates a directory of the information services and transmits the directory to a plurality of portable communication devices (subscriber units) on a mail drop or group address port. The plurality of portable communication devices receive the directory of information services and generate an interactive menu of information services of which can be called-up from a plurality of address ports on the portable communication device. When the interactive menu is called-up on an address port, the user can select or change an information service from the menu. If another information service was previously selected, then the new selection changes the pervious information service selection to the newly selected information service at that address port. The selected information service is subsequently received on that address port after the portable communication device verifies that the same service is not selected on another address port. Thereafter, the portable communication device transmits a request to receive the selected information service and upon a verification by the communication system, the service is transmitted to the portable communication unit.

In summary, a selective call communication system has at least one base site and a plurality of subscriber units. The selective call communication system comprises a base site receiver for receiving information services, a base site processor for processing the information services and creating a directory of information service and a base site transmitter for transmitting the directory to at least one subscriber unit. The at least one subscriber unit comprises a plurality of assignable address ports and a receiver for receiving the directory of information services on a mail drop address port. A controller generates a menu from the directory of information services and a display displays the menu of the information services from the plurality of the assignable address ports enabling a user interface to select an information service from the menu of information services to be received on an assignable address port of the plurality of assignable address ports. The controller, coupled to the user interface, assigns the information service being selected to the assignable address port identified and a transmitter transmits a request for the selected information service including an address for identifying the subscriber unit selectable address port to the selective call communication system. The programmer reprograms the subscriber unit with an access code for receiving the information services.

We claim:

1. A selective call communication system having at least one base site and a plurality of subscriber units, the at least one base site, comprising:
- a base site receiver for receiving information services;
- a base site processor for processing the information services and creating a directory of information services;
- a base site transmitter for transmitting the directory to a subscriber unit, the subscriber unit comprising:
  - a plurality of assignable address ports;
  - a receiver for receiving the directory of information services on a mail drop address port;
  - a controller for generating a menu from the directory of information services;
  - a display for displaying the menu of information services from the plurality of assignable address ports;
  - a user interface for selecting an information service from the menu of information services to be received on an assignable address port of the plurality of assignable address ports;
  - the controller, coupled to the user interface, for assigning the information service being selected to the assignable address port being identified; and
  - a transmitter for transmitting a request for the information service being selected including an address for identifying the assignable address port of the subscriber unit to the selective call communication system.

2. The selective call communication system according to claim 1 further comprising a programmer for reprogramming the subscriber unit with an access code to receive the information services.

3. The selective call communication system according to claim 2 wherein the base site processor determines when the information service requested is a pay-to-receive service; and
the base site transmitter transmits subscription information to the subscriber unit.

4. The selective call communication system according to claim 1 wherein the controller activates the display for displaying the menu associated with the assignable address port from which the menu was selected.

5. The selective call communication system according to claim 4 wherein the controller suspends the request for the information service when the information service is being received on another assignable address port.

6. The selective call communication system according to claim 4 wherein
the controller of the subscriber unit accesses a memory for retrieving an address designating the assignable address port; and
a programmer programs the subscriber unit to direct the information service being selected at the assignable address port.

7. The selective call communication system according to claim 6 wherein the controller of the subscriber unit accesses subscription information in the memory to determine when the information service being selected is a pay-to-receive service.

8. In a communication system, a method for dynamically selecting information services being provided to subscriber units assigned thereto, comprising the steps of:
transmitting a directory of information services to the subscriber units for identifying available information services;
receiving a request from a subscriber unit for a subscription of an information service identified from the directory of information services;
determining whether the subscriber unit is authorized to receive the information service requested;
transmitting an access code to the subscriber unit, the method in the subscriber unit comprising the steps of:
receiving the directory of information services at a group address;
generating an interactive menu from the directory of information services;
displaying the interactive menu when an information service is selected from the interactive menu; and
transmitting a request for the information service.

9. The method according to claim 8 further comprising the step of reprogramming the subscriber unit with the access code.

10. The method according to claim 8 further comprising the step of reprogramming an address port for receiving the information service being selected.

11. The method according to claim 8 further comprising the step of suspending the request for the information service when the information service is being received on another assignable address port.

12. A selective call transceiver, comprising:
a plurality of assignable address ports;
a receiver for receiving a directory of information services on a mail drop address port;
a controller for generating a menu from the directory of information services;
a display for displaying the menu of the information services from the plurality of assignable address ports;
a user interface for selecting an information service from the menu of information services to be received on an assignable address port of the plurality of assignable address ports;
the controller, coupled to the user interface, for assigning the information service being selected to the assignable address port being identified; and
a transmitter for transmitting a request for the information service being selected including an address for identifying selectable address port.

13. The selective call transceiver according to claim 12 wherein the controller accesses subscription information in a memory to determine when the information service being selected is a pay-to-receive service.

14. The selective call transceiver according to claim 12 further comprising a programmer for programming the controller with an access code received from a base site in response to a request for information service.

15. The selective call transceiver according to claim 12 wherein the user interface activates the display for displaying the menu associated with the assignable address port from which the menu was selected.

16. The selective call transceiver according to claim 12 further comprises a memory for storing the menu of information services received.

17. The selective call transceiver according to claim 16 wherein the controller accesses the memory for retrieving an address designating the assignable address port; and a programmer programs the selective call transceiver to direct the information service being selected at the assignable address port.

18. The selective call transceiver according to claim 17 wherein the controller suspends the request for the information service when the information service is being received on another assignable address port.

19. In a selective call receiver for receiving information services, a method for dynamically selecting information services being provided to subscriber units assigned thereto, comprising the steps of:

receiving a directory of information services at a group address;

generating an interactive menu from the directory of information services;

displaying the interactive menu for enabling a user to select an information service from the interactive menu;

determining when the information service is already been selected;

reprogramming an address port to receive the information service being selected;

transmitting a request for the information service; and receiving an access code enable the information service to be received.

20. The method according to claim 19 further comprising the step of programming the selective call receiver with the access code for receiving the information service.

* * * * *

UNITED STATES PATENT AND TRADEMARK OFFICE
CERTIFICATE OF CORRECTION

PATENT NO. : 5,694,120
DATED : December 2, 1997
INVENTOR(S) : Indekeu et al.

It is certified that error appears in the above-indentified patent and that said Letters Patent is hereby corrected as shown below:

On cover page, add the following inventors:

--Frank Falcone, Loxahatchee, Fla.--
--Eugene Lopatukhin, Boynton Beach, Fla.--
--Gregory A. Coonley, Keller, TX--

Signed and Sealed this

Ninth Day of June, 1998

*Attest:*

BRUCE LEHMAN

*Attesting Officer*   *Commissioner of Patents and Trademarks*